United States Patent
Cavallaro et al.

[11] Patent Number: 5,759,676
[45] Date of Patent: Jun. 2, 1998

[54] MULTILAYER GOLF BALL

[75] Inventors: Christopher Cavallaro, Attleboro; Murali Rajagopalan, South Darmouth, both of Mass.; Samuel A. Pasqua, Jr., Bristol, R.I.; Herbert C. Boehm, Norwell; Kevin M. Harris, New Bedford, both of Mass.

[73] Assignee: Acushnet Company, Fairhaven, Mass.

[21] Appl. No.: 603,057

[22] Filed: Feb. 16, 1996

Related U.S. Application Data

[63] Continuation-in-part of Ser. No. 482,522, Jun. 7, 1995.

[51] Int. Cl.$^6$ .................................................. B32B 7/02
[52] U.S. Cl. ................. 428/215; 428/308.4; 428/423.1; 428/423.7; 428/424.2; 428/474.7; 428/475.2; 428/480; 428/483; 428/500; 428/515; 428/516; 428/517; 428/519; 428/520; 428/521; 428/522; 428/523; 473/351; 473/356; 473/370; 473/371; 473/374
[58] Field of Search ................. 428/423.1, 423.7, 428/424.2, 474.7, 475.2, 480, 483, 500, 515, 516, 517, 519, 520, 521, 522, 523; 473/351, 356, 370, 371, 374

[56] References Cited

U.S. PATENT DOCUMENTS

| | | | |
|---|---|---|---|
| 696,353 | 3/1902 | Richards . | |
| 696,366 | 3/1902 | Kempshall . | |
| 3,310,102 | 3/1967 | Trombe | 165/133 |
| 3,359,231 | 12/1967 | Kent | 524/493 |
| 3,490,146 | 1/1970 | Guichet | 433/69 |
| 4,123,061 | 10/1978 | Dusbiber | 473/377 |
| 4,234,184 | 11/1980 | Deleens et al. | 473/378 |
| 4,337,947 | 7/1982 | Saito et al. | 473/356 |
| 4,398,000 | 8/1983 | Kataoka et al. | 525/437 |
| 4,431,193 | 2/1984 | Nesbitt | 273/235 R |
| 4,625,964 | 12/1986 | Yamada | 273/62 |
| 4,650,193 | 3/1987 | Molitor et al. | 273/228 |
| 4,714,253 | 12/1987 | Nakahara et al. | 273/228 |
| 4,781,383 | 11/1988 | Kamada et al. | 273/228 |
| 4,848,770 | 7/1989 | Shama | 273/228 |
| 4,863,167 | 9/1989 | Matsuki et al. | 273/62 |
| 4,884,814 | 12/1989 | Sullivan | 514/524 |
| 4,919,434 | 4/1990 | Saito | 273/235 R |
| 4,984,804 | 1/1991 | Yamada et al. | 473/372 |
| 4,986,545 | 1/1991 | Sullivan | 473/372 |
| 5,000,459 | 3/1991 | Isaac | 473/356 |
| 5,002,281 | 3/1991 | Nakahara et al. | 273/220 |
| 5,026,067 | 6/1991 | Gentiluomo | 273/220 |
| 5,068,151 | 11/1991 | Nakamura | 428/407 |
| 5,072,944 | 12/1991 | Nakahara et al. | 273/220 |
| 5,104,126 | 4/1992 | Gentiluomo | 273/238 |
| 5,120,791 | 6/1992 | Sullivan | 525/196 |
| 5,150,906 | 9/1992 | Molitor et al. | 273/220 |
| 5,159,035 | 10/1992 | Evani | 526/196 |
| 5,184,828 | 2/1993 | Kim et al. | 273/228 |
| 5,222,739 | 6/1993 | Horiuchi et al. | 473/356 |

(List continued on next page.)

FOREIGN PATENT DOCUMENTS

| | | |
|---|---|---|
| 0 637 459 A1 | 2/1995 | European Pat. Off. . |
| 2 260 546 | 4/1993 | United Kingdom . |
| 2 267 908 | 12/1993 | United Kingdom . |
| 2 278 609 | 12/1994 | United Kingdom . |

*Primary Examiner*—E. Rollins Buffalow
*Attorney, Agent, or Firm*—Pennie & Edmonds LLP

[57] ABSTRACT

The present invention is directed towards a multi-layer golf ball which comprises a core with one or more layers; at least one cover layer; and one or more mantle layers disposed between the core and cover layer, wherein the mantle layer comprises thermoplastic polyetherester, thermoplastic polyesterester dynamically vulcanized thermoplastic elastomer, functionalized styrene-butadiene elastomer, thermoplastic polyurethane, metallocene polymer or blends thereof and thermoset materials. Further, the present invention is directed to a ball having a core, a coverlayer and a mantle layer therebetween wherein the mantle layer has a flex modulus of less than 10,000 psi and the cover has a flex modulus greater than 80,000 psi.

38 Claims, 1 Drawing Sheet

U.S. PATENT DOCUMENTS

| | | | |
|---|---|---|---|
| 5,253,871 | 10/1993 | Viollaz | 273/228 |
| 5,298,571 | 3/1994 | Statz et al. | 525/330 |
| 5,314,187 | 5/1994 | Proudfit | 273/235 R |
| 5,415,937 | 5/1995 | Cadorniga et al. | 428/407 |
| 5,439,227 | 8/1995 | Egashira et al. | 273/223 |
| 5,467,994 | 11/1995 | Moriyama et al. | 273/222 |
| 5,492,972 | 2/1996 | Stefani | 525/196 |
| 5,553,852 | 9/1996 | Higuchi et al. | 473/373 |
| 5,556,098 | 9/1996 | Higuchi et al. | 473/373 |

MULTILAYER GOLF BALL

This application is a continuation-in-part of co-pending U.S. patent application Ser. No. 08/482,522, filed Jun. 7, 1995, pending.

FIELD OF INVENTION

This invention relates generally to golf balls, and more specifically, to a multilayer golf ball. In particular, this invention relates to a golf ball having a core with one or more layers, at least one cover layer with a flexural modulus ranging from about 1,000 psi to about 200,000 psi and one or more mantle layers disposed between the core and cover layer. The multilayer golf balls of the present invention have been found to provide the distance and durability characteristics approaching that of a conventional two piece ball while also providing the "click and feel" of a conventional three piece or "wound" ball.

BACKGROUND

Conventional golf balls can be divided into two general types or groups: two piece balls or wound balls (also know as three piece balls). The difference in play characteristics resulting from these different types of constructions can be quite significant.

Balls having a two piece construction are generally most popular with the average recreational golfer because they provide a very durable ball while also providing maximum distance. Two piece balls are made with a single solid core, usually made of a crosslinked rubber, which is encased by a cover material. Typically the solid core is made of polybutadiene which is chemically crosslinked with zinc diacrylate and/or similar crosslinking agents and is covered by a tough, cut-proof blended cover. The cover is generally a material such as SURLYN®, which is a trademark for an ionomer resin produced by DuPont. The combination of the core and cover materials provide a "hard" ball that is virtually indestructible by golfers. Further, such a combination imparts a high initial velocity to the ball which results in improved distance. Because these materials are very rigid, two piece balls have a hard "feel" when struck with a club. Likewise, due to their hardness, these balls have a relatively low spin rate which makes them difficult to control, particularly on shorter approach shots. However, as golf ball manufacturers continue to improve the spin and feel characteristics of the two piece ball, it is likely that the two piece ball will continue to grow in popularity.

But, at the present time, the wound ball remains the preferred ball of the more advanced players due to its superior spin and feel characteristics. Wound balls typically have either a solid rubber or liquid center core around which many yards of a stretched elastic thread or yarn are wound. The wound core is then covered with a durable cover material such as a SURLYN® or similar material or a softer cover such as Balata. Wound balls are generally softer and provide more spin, which enables a skilled golfer to have more control over the ball's flight. However, wound higher spinning balls typically have a shorter distance as compared to a two piece ball. Moreover, as a result of their more complex structure, wound balls generally require a longer time to manufacture and are more expensive to produce than a two piece ball.

Consequently, a need exists for an improved ball which provides the "click and feel" of a wound ball, while also providing the relative ease of manufacturing, durability and distance of a two piece ball.

DESCRIPTION OF THE PRIOR ART

Several patents have been issued which are directed towards modifying the properties of a conventional two piece ball by altering the typical single layer core and single cover layer construction to provide a multi-layer core. The inventions disclosed in the prior art patents are directed towards improving a variety of golf ball characteristics.

Several patents are directed towards improving the carry distance of the ball. For example, U.S. Pat. No. 4,863,167 relates to a three piece solid golf ball having improved rebound characteristics in order to increase its flight distance. This golf ball has a center portion and the outer layer formed from a rubber composition, preferably having a base rubber of polybutadiene, wherein the outer layer further contains a gravity filler such as tungsten or tungsten carbide so as to impart a higher specific gravity to the outer layer than that of the inner layer. The difference in specific gravity of the layers should be 0.15–0.8 for small balls and 0.15–0.45 for large balls. Preferably, the outer layer is harder than the center portion.

U.S. Pat. No. 5,184,828 relates to a solid three-piece golf ball having improved rebound characteristics and carry distance while maintaining an adequate spin rate. These characteristics are obtained by controlling the size of the inner core and outer layer as well as the specific gravity and hardness. The core and mantle layers are made from a rubber compound such as polybutadiene, and have a Shore D hardness of 30–62 and 30–56 respectively. The key to obtaining the desired rebound characteristics is that the maximum hardness (42–62) must be located at the interface between the core and the mantle and the hardness must then decrease both inwardly and outwardly.

U.S. Pat. No. 4,714,253 is also directed towards a three-piece golf ball having an excellent rebound coefficient. This golf ball has a core with a Shore C hardness of 57–80 in its center, but not more than 83 at a distance between 5–10 mm from its center and an outer layer with a Shore C hardness of 70–83.

Additionally, there are a number of patents also directed towards improving the spin, click or feel of solid balls while maintaining the distance provided by the solid construction. A variety of approaches to manipulating the core construction are described in the art. For example, U.S. Pat. No. 5,072,944 discloses a three-piece solid golf ball having a center and outer layer which are prepared from a rubber composition, preferably having a base rubber of polybutadiene. It is desirable that the center core is softer than the outer layer, each having a hardness (Shore C) of 25–50 and 70–90 respectively.

U.S. Pat. No. 4,625,964 relates to a solid golf ball having a polybutadiene rubber core of a diameter not more than 32 mm, and a polybutadiene rubber intermediate layer having a specific gravity of lower than that of the core material, and a cover.

U.S. Pat. No. 4,650,193 is directed towards a solid golf ball having a core comprising of a central portion and an integral outer layer. Preferably the core is a curable elastomer such as polybutadiene which is treated with a cure altering agent to soften an outer layer of the core, thereby producing a central layer with a hardness (Shore C) of greater than 75 and an outer layer with a hardness (Shore A) of less than 80.

U.S. Pat. No. 4,848,770 discloses a non-wound three-piece golf ball which includes a core of a highly filled synthetic rubber or polymeric material, an intermediate mantle of an unfilled synthetic rubber and a cover. The core and intermediate mantle have a hardness of between 50–95.

U.S. Pat. No. 5,002,281 is directed towards a three-piece solid golf ball which has an inner core having a hardness of 25–70 (Shore C), an outer shell having a hardness of 80–95 (Shore C) and a cover. Further, the specific gravity of the inner core must be greater than 1.0, but less than or equal to that of the outer shell, which must be less than 1.3.

U.S. Pat. No. 5,253,871 concerns a golf ball having a three piece structure comprising an elastomer core, an intermediate layer of a thermoplastic material containing at least 10% of ether block copolymer, preferably blended with an ionomer and a thermoplastic cover.

Further, there are also several patents which are directed to golf balls having multiple cover layers. For example U.S. Pat. No. 4,431,193 relates to a golf ball having a multilayer cover wherein the inner layer is a hard, high flexural modulus ionomer resin and the outer layer is a soft, low flexural modulus ionomer resin, and wherein either or both layers may comprise a foamed ionomer resin.

U.S. Pat. No. 5,314,187 also relates to golf balls having a multiple layer cover, wherein the outer layer is molded over the inner layer and comprises a blend of balata and an elastomer and the inner layer is an ionomer resin.

U.S. Pat. No. 4,919,434 is directed towards a golf ball having a cover which comprises an inner layer and an outer layer each of which comprise a thermoplastic resin, preferably the layers comprise of materials that are capable of fusion bonding with each other.

However, none of these patents disclose a multi-layer ball having the materials and material property requirements as disclosed herein to provide the improved golf balls of the present invention.

SUMMARY OF THE INVENTION

The present invention is directed towards a multi-layer golf ball which provides a soft feel similar to a conventional wound ball, while also providing the distance, durability and relative ease of manufacturing of a conventional two piece ball.

The present invention is further directed towards a multi-layer golf ball which comprises a core with one or more layers; at least one cover layer; and one or more mantle layers disposed between the core and cover layer, wherein the mantle layer comprises thermoplastic polyetherester, thermoplastic polyetheramide, dynamically vulcanized thermoplastic elastomer, functionalized styrene-butadiene elastomer, thermoplastic polyurethane, metallocene polymer, or blends thereof and/or thermoset materials.

In a preferred embodiment, the present invention is also directed towards a multi-layer golf ball which comprises a core; a cover layer comprising an inner layer and an outer layer, wherein the outer layer comprises a material with a lower melting point or heat of reaction temperature (also referred to as cure temperature) than that of the material of the inner layer; and at least one mantle layer disposed between the core and cover layer, wherein the mantle layer comprises thermoplastic polyetherester, thermoplastic polyetheramide, dynamically vulcanized thermoplastic elastomer, functionalized styrene-butadiene elastomer, thermoplastic polyurethane or metallocene polymer and blends thereof.

The present invention is still further directed to a multi-layer golf ball which comprises a core, at least one cover layer and at least one mantle layer disposed between the core and cover layer wherein properties such as the thickness, hardness, flexural modulus, tensile modulus or Bayshore resilience of the various layers is such as to provide a ball with optimum performance characteristics.

DETAILED DESCRIPTION OF THE INVENTION

Figure 1:
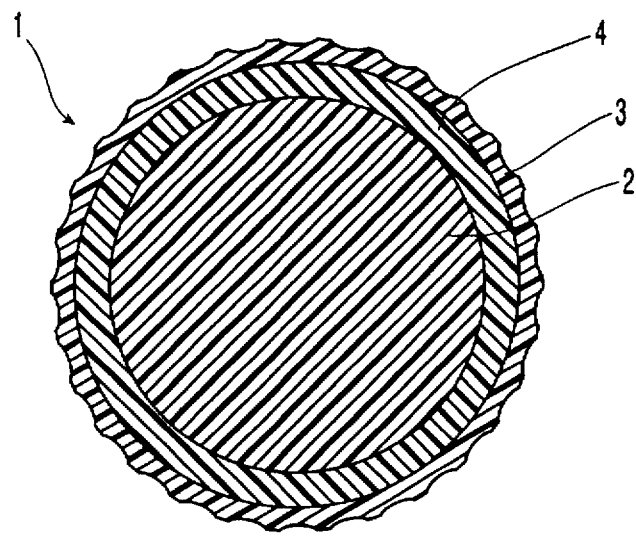
FIG. 1 is a cross-sectional view of a golf ball according to the present invention.
Figure 2:
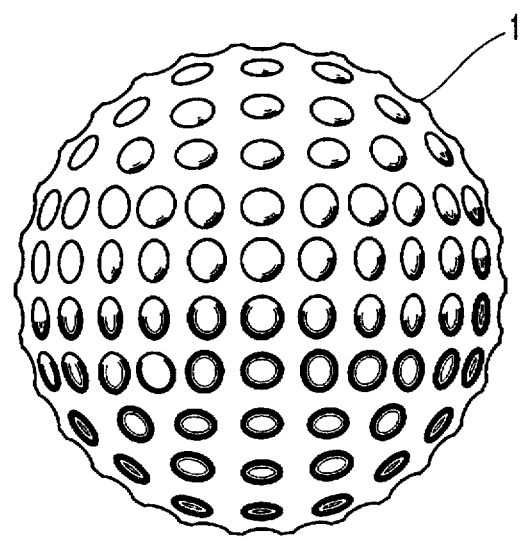
FIG. 2 is a perspective view of a golf ball according to the present invention.

Referring to FIGS. 1 and 2, this invention is particularly directed towards a multi-layer golf ball 1 which comprises a core 2, at least one cover layer 3 and at least one mantle layer 4 disposed therebetween. The mantle layer comprises thermoplastic polyetherester, thermoplastic polyetheramide dynamically vulcanized thermoplastic elastomer, functionalized styrene-butadiene elastomer, thermoplastic polyurethane or metallocene polymer or blends thereof.

In a preferred embodiment of the present invention, the mantle layer is a thermoplastic polyetherester. Suitable thermoplastic polyetheresters include Hytrel® 3078, Hytrel® G3548W and Hytrel® G4078W which are commercially available from DuPont. Hytrel® 3078 being the most preferred. The mantle layer preferably has a specific gravity greater than 1 and less than 1.2.

Suitable dynamically vulcanized thermoplastic elastomers include Santoprene®, Sarlink®, Vyram®, Dytron® and Vistaflex®. Santoprenes is the trademark for a dynamically vulcanized PP/EPDM. Santoprene® 203–40 is an example of a preferred Santoprene® and is commercially available from Advanced Elastomer Systems. Examples of suitable functionalized styrene-butadiene elastomers include Kraton FG-1901x and FG-1921x, which is available from the Shell Corporation. Examples of suitable thermoplastic polyurethanes include Estane® 58133, Estane® 58134 and Estane® 58144, which are commercially available from the B. F. Goodrich Company. Suitable metallocene polymers whose melting points are higher than the cover materials can also be employed in the mantle layer of the present invention. Further, the materials for the mantle layer described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass.

The mantle layer may comprise up to 100% by weight of a dynamically vulcanized thermoplastic elastomer, a functionalized styrene-butadiene elastomer, a thermoplastic polyurethane, a metallocene polymer or blends thereof. In a preferred embodiment of the present invention, the mantle layer comprises Santoprene®, thermoplastic polyurethane or blends thereof.

However, in another preferred embodiment of the present invention, the mantle layer is a blend of a first and a second thermoplastic, wherein the first thermoplastic is a dynamically vulcanized thermoplastic elastomer, a functionalized styrene-butadiene elastomer, a thermoplastic polyurethane or a metallocene polymer and the second thermoplastic is a material such as a thermoplastic polyurethane, a thermoplastic polyetherester or polyetheramide, a thermoplastic ionomer resin, a thermoplastic polyester, another dynamically vulcanized elastomer, another a functionalized styrene-butadiene elastomer, another a metallocene polymer or blends thereof.

Suitable thermoplastic polyetheresters include Hytrel® 3078, Hytrel® G3548W and Hytrel® G4078W which are commercially available from DuPont. Suitable thermoplastic polyetheramides include Pebax® 2533, Pebax® 3533 and Pebax® 4033 which are available from Elf-Atochem. Suitable thermoplastic ionomer resins include any number of olefinic based ionomers including SURLYN® and Iotek®, which are commercially available from DuPont and Exxon, respectively. The flexural moduli for these ionomers is about 100 kpsi to 20 about 200 kpsi. Suitable thermoplastic polyesters include polybutylene terephthalate. Likewise, the dynamically vulcanized thermoplastic elastomers, functionalized styrene-butadiene elastomers, thermoplastic polyurethane or metallocene polymers identified above are also useful as the second thermoplastic in such blends. Further, the materials of the second thermoplastic described above may be in the form of a foamed polymeric material.

Such thermoplastic blends comprise about 1% to about 99% by weight of a first thermoplastic and about 99% to about 1% by weight of a second thermoplastic. Preferably the thermoplastic blend comprises about 5% to about 95% by weight of a first thermoplastic and about 5% to about 95% by weight of a second thermoplastic. In a preferred embodiment of the present invention, the first thermoplastic material of the blend is a dynamically vulcanized thermoplastic elastomer, such as Santoprene®.

The core of the present invention may comprise a variety of materials, including those conventionally employed as golf ball cores. The conventional materials for such cores include core compositions having a base rubber, a crosslinking agent, a filler and a co-crosslinking agent. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. The initiator included in the core composition can be any known polymerization initiator which decomposes during the cure cycle. The crosslinking agent includes a metal salt of an unsaturated fatty acid such as a zinc salt or a magnesium salt of an unsaturated fatty acid having 3 to 8 carbon atoms such as acrylic or methacrylic acid. The filler typically includes materials such as zinc oxide, barium sulfate, silica, calcium carbonate, zinc carbonate and the like.

Preferably, the core is a cross-linked 1,4-polybutadiene having a specific gravity greater than 1.2 and, more preferably, about 1.25. The high specific gravity of the core decreases the spin rate of the ball for a lower flight path. Also, the PGA compression of the core is preferably greater than 60 and, more preferably, about 65.

In one embodiment of the present invention, the core comprises a center which is liquid-filled or solid around which an elastic thread is wound. The solid center is typically a homogenous mass of a resilient material such as polybutadiene or a natural rubber. The liquid-filled center is typically a thin walled sphere into which a liquid such as corn syrup is injected by means of a hypodermic needle. The sphere is then sealed and frozen to make the center a solid mass. The windings for either type of center are provided by an elastic thread which is stretched and wound about the center to a desired thickness.

Conventionally, the centers of wound cores have a diameter of about 1.0 to about 1.125 inches. The outer diameter of a conventional wound core is about 92% of the overall diameter of the finished ball. However, the outer diameter of wound cores employed in this embodiment of the present invention have an overall diameter of less than 90% of the overall diameter of the finished ball. Preferably, the wound cores have a diameter of about 75–90% of the overall diameter of the finished ball. Most preferably, the wound cores of the present invention have an overall diameter of about 85% of the diameter of the finished ball.

The cover layer of the present invention comprises at least one layer of a thermoplastic or thermosetting material. Any number of a wide variety of cover materials may be used in the present invention. Among the preferred conventional cover materials are ionomer resins and low modulus ionomers obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, low modulus ionomers, such as acid-containing ethylene copolymer ionomers, include E/X/Y copolymers where E is ethylene, X is a softening comonomer such as acrylate or methacrylate present in 0–50 (preferably 0–25, most preferably 0–2), weight percent of the polymer, and Y is acrylic or methacrylic acid present in 5–35 (preferably 10–35, most preferably 15–20) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which these ionomers are made is well known in the art as described in e.g. U.S. Pat. No. 3,262,272. Such ionomer resins are commercially available from DuPont Co. under the tradename SURLYN®. The presently preferred cover material is a 50/50 blend of SURLYN® 8140 and SURLYN® 7940, which are high acid sodium and standard lithium SURLYNS®, respectively. This cover material has a flex modulus of about 85 ksi and a specific gravity of about 0.95. Another preferred cover is comprised of a 50/50 blend of SURLYN® 8140 and SURLYN® SEP671, which is a lithium SURLYN® having about 19% methacrylic acid. This material has a flex modulus of about 105 ksi. Preferably, the flex modulus of the cover is greater than 80 ksi. Still further, the preferred cover has a hardness of about 70 Shore D. The high flex modulus of the cover provides increased initial velocity and a low spin rate.

In another preferred embodiment of the present invention, the cover layer comprises an inner layer and an outer layer. The inner layer of the cover is either a thermoplastic material such as a thermoplastic elastomer or a thermoplastic rubber, or a thermoset rubber or thermoset elastomer material. Some examples of materials suitable for use as the inner cover layer include polyether or polyester thermoplastic urethanes as well as thermoset polyurethanes. A preferable thermoplastic material is a thermoplastic urethane with a melting point of about 178° to about 205° F. A preferable thermoset material is a rubber based, castable urethane. The outer layer of the cover is either a thermoplastic plastic material such as an elastomer or a thermoplastic rubber, or a thermosetting material. Suitable materials for the outer layer include Urethanes, ionomers with a low modulus and other "dead" but durable materials such as EPDM and butyl rubber. Additionally, the present invention also contemplates the use of a polymeric foam material, such as the metallocene-based foamed resin described above, as the material for either the outer cover layer or the inner cover layer, but preferably not both layers.

In one embodiment of the present invention, it is preferable that the thermoplastic or thermosetting materials of the outer layer have a melting point or heat of reaction (cure) temperature less than the melting point or heat of reaction (cure) temperature of the materials of the inner layer.

The inner and outer cover layers of this embodiment of the invention can be molded about the core and mantle layers through a variety of conventional molding methods. For example, the cover layers can be compression molded, retractable pin injection molded, fixed pin injection molded, cast around the core and mantle or a combination thereof. However, it is important that the materials of the outer layer are characterized in that they have thermal properties such that no flow of the inner layer material occurs during the molding of the outer cover layer about the inner layer, regardless of the process employed to mold the layers.

The inner cover layer of this embodiment of the present invention has a thickness of about 0.005 inches to about 0.040 inches. The outer cover layer has a thickness of about 0.010 inches to about 0.100 inches. Preferably, the inner cover layer has a thickness of about 0.010 inches to about 0.030 inches and the outer cover layer has a thickness of about 0.030 inches to about 0.090 inches.

The present invention also contemplates the use of a variety of non-conventional cover materials. In particular, the covers of the present invention may comprise thermoplastic or engineering plastics such as ethylene or propylene based homopolymers and copolymers including functional monomers such as acrylic and methacrylic acid and fully or partially neutralized ionomers and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), reinforced engineering plastics, acrylonitrile-butadiene, acrylic-styrene-acrylonitrile, poly(ethylene terephthalate), poly(butylene terephthalate), poly(ethylene-vinyl alcohol), poly (tetrafluoroethylene and their copolymers including functional comonomers and blends thereof. These polymers or copolymers can be further reinforced by blending with a wide range of fillers and glass fibers or spheres or wood pulp.

The properties such as hardness, Bayshore resilience, modulus, core diameter and mantle layer thickness of the golf balls of the present invention have been found to effect play characteristics such as spin, initial velocity and feel of the present golf balls.

In particular, the thickness of the mantle layer of the present invention is about 0.025 inches to about 0.125 inches. Preferably, the thickness of the mantle layer is about 0.04 inches to about 0.10 inches. Most preferably, the thickness of the mantle layer is about 0.06 inches. Similarly, the diameter of the core of the present invention is about 1.25 inches to about 1.51 inches. Preferably the diameter of the core is about 1.30 inches to about 1.48 inches. Most preferably, the diameter of the core is about 1.39 inches. The overall diameter of the core and mantle layer is about 84% to about 97% of the overall diameter of the finished ball, and is preferably about 1.51 inches.

The present multi-layer golf ball can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches. However, oversized game balls well in excess of 1.800 inches are also contemplated by the present invention.

Several physical properties such as hardness, resilience and modulus of the various layers of the golf balls of the present invention are believed to impact the playing characteristics of such golf balls. For example, the flexural and/or tensile moduli of the mantle layer are believed to have an effect on the "feel" of the golf balls of the present invention. Accordingly, it is preferable that the golf balls of the present invention have a mantle layer with a flexural modulus of about 500 psi to about 50,000 psi in order to impart a softer "feel" to the golf balls of the present invention. Likewise, it is preferred that the mantle layer have a tensile modulus of about 500 psi to about 50,000 psi in order to impart a softer "feel" to the golf balls of the present invention. More preferably, the flex modulus and tensile modulus of the mantle layer are both less than about 10,000 psi. Most preferably, the flex modulus of the mantle layer is less than 5000 psi.

Further, the core of the present invention has a Bayshore resilience of about 30 to about 80. Preferably the core has a Bayshore resilience of about 40 to about 70. The mantle layer of the present invention has a Bayshore resilience of about 35 to about 75. Preferably the mantle layer has a Bayshore resilience of about 60–70.

The golf balls of the present invention have a mantle layer with a Shore D hardness of less than about 60. Preferably, the Shore D hardness of the mantle layer is about 20 to about 60. Most preferably, the mantle layer has a Shore D hardness of about 30 to provide the soft "feel" desired. The core has a Shore D hardness of about 30 to about 65. Preferably, the core has a Shore D hardness of about 35 to about 60.

In the preferred ball, the specific gravities of the ball materials increase toward the center of the ball. In other words, the specific gravity of the core is greater than the specific gravity of the mantle layer, which is greater than the specific gravity of the cover. More particularly, the core preferably has a specific gravity greater than about 1.2, the mantle layer has a specific gravity between about 1 and 1.2 and the cover has a specific gravity of less than about 1.1.

The golf balls of the present invention can be made by any conventional process employed in the golf ball art. For example, the solid cores can be either injection or compression molded. Similarly, the undersized wound cores of the present invention are produced through conventional means. The mantle layer is subsequently injection or compression molded about the core. It is important that the mantle material be able to sustain the temperatures applied during the application of the cover layer. The cover layer or layers are then injection or compression molded or cast about the mantle layer.

In the manufacturing of the ball, the core is compression molded. The mantle layer is molded over the core using a fixed-pin mold such that a plurality of apertures are formed in the mantle layer. Then the cover is molded over the mantle layer such that some of the cover material flows into the apertures in the mantle layer, thereby forming a mechanical interlock.

Illustrated in Table I are a number of batch formulations for several mantle layer compositions of the present invention, as well as properties such a hardness (Shore D), Bayshore resilience, flexural modulus, % strain at break and tensile modulus for each composition.

The following examples of batch compositions are given to illustrate the novel multi-layer golf balls of the present invention. However, it is to be understood that the examples are only for illustrative purposes and in no manner is the present invention limited to the specific disclosures therein.

TABLE I

Mantle Layer Compositions and Properties

| Sample | | Hardness (Shore D) | Resilience | Flex Modulus (psi) | Tensile Modulus (psi) | % Strain at Break |
|---|---|---|---|---|---|---|
| 1A | 0% Hytrel 5556 100% Hytrel 3078 | 30 | 62 | 4000 | 2,078 | 810 no break |
| 1B | 25% Hytrel 5556 75% Hytrel 3078 | 37 | 59 | 8,170 | 5,122 | 685 |
| 1C | 50% Hytrel 5556 50% Hytrel 3078 | 44 | 55 | 15,320 | 10,879 | 590 |
| 1D | 75% Hytrel 5556 25% Hytrel 3078 | 53 | 50 | 19,870 | 16,612 | 580 |
| 1E | 100% Hytrel 5556 0% Hytrel 3078 | 58 | 50 | 24,840 | 17,531 | 575 |
| 2A | 0% Estane 58091 100% Estane 58861 | 28 | 54 | 1,720 | 756 | 563 |
| 2B | 25% Estane 58091 75% Estane 58861 | 34 | 41 | 2,610 | 2,438 | 626 |
| 2C | 50% Estane 58091 50% Estane 58861 | 44 | 31 | 10,360 | 10,824 | 339 |
| 2D | 75% Estane 58091 25% Estane 58861 | 61 | 34 | 43,030 | 69,918 | 149 |
| 2E | 100% Estane 58091 0% Estane 58861 | 78 | 46 | 147,240 | 211,288 | 10 |
| 3A | 0% Hytrel 5556 100% Hytrel 4078 | 40 | 51 | 9,250 | 7,071 | 527 |
| 3B | 25% Hytrel 5556 75% Hytrel 4078 | 43 | 51 | 10,020 | 9,726 | 441 |
| 3C | 50% Hytrel 5556 50% Hytrel 4078 | 45 | 47 | 12,280 | 10,741 | 399 |
| 3D | 75% Hytrel 5556 25% Hytrel 4078 | 48 | 53 | 13,680 | 13,164 | 374 |
| 3E | 100% Hytrel 5556 0% Hytrel 4078 | 48 | 52 | 12,110 | 15,231 | 347 |
| 4A | 0% Hytrel 4078 100% Pebax 4033 | 46 | 51 | 11,150 | 8,061 | 597 |
| 4B | 25% Hytrel 4078 75% Pebax 4033 | 46 | 53 | 10,630 | 7,769 | 644 |
| 4C | 50% Hytrel 14078 50% Pebax 4033 | 45 | 52 | 9,780 | 8,117 | 564 |
| 4D | 75% Hytrel 4078 25% Pebax 4033 | 42 | 53 | 9,310 | 7,996 | 660 |
| 4E | 100% Hytrel 4078 0% Pebax 4033 | 40 | 51 | 9,250 | 7,071 | 527 |
| 5A | 0% Hytrel 3078 100 Estane 5809 | 77 | 50 | 156,070 | 182,869 | 9 |
| 5B | 25% Hytrel 3078 75% Estane 5809 | 65 | 48 | 87,680 | 96,543 | 33 |
| 5C | 50% Hytrel 3078 50% Estane 5809 | 52 | 49 | 53,940 | 48,941 | 102 |
| 5D | 75% Hytrel 3078 25% Estane 5809 | 35 | 54 | 12,040 | 6,071 | 852 |
| 5E | 100% Hytrel 3078 0% Estane 5809 | 30 | 62 | 4000 | 2,078 | 810 no break |
| 6A | 100% Kraton 1921 0% Estane 58091 0% Surlyn 7940 | 29 | 59 | 24,300 | 29,331 | 515 |
| 6B | 50% Kraton 1921 50% Estane 58091 | 57 | 49 | 56,580 | — | 145 |

TABLE I-continued

Mantle Layer Compositions and Properties

| Sample | Hardness (Shore D) | Resilience | Flex Modulus (psi) | Tensile Modulus (psi) | % Strain at Break |
|---|---|---|---|---|---|
| 6C 0% Surlyn 7940<br>50% Kraton 1921<br>0% Estane 58091 | 56 | 55 | 28,290 | 28,760 | 295 |
| 7A 50% Surlyn 7940<br>33.3% Pebax 4033<br>33.3% Estane 58091 | 48 | 50 | 41,240 | 30,032 | 294 |
| 7B 33.3% Hytrel 3078<br>30% Pebax 4033<br>40% Estane 58091<br>10% Hytrel 3078 | 48 | 50 | 30,650 | 14,220 | 566 |
| 7C 20% Pebax 4033<br>40% Estane 58091<br>40% Hytrel 3078 | 41 | 54 | 24,020 | 16,630 | 512 |

Tables II and III provide test data for one embodiment of the present invention. In particular, the spin rate and velocity were measured for a golf ball of the present invention wherein the mantle layer was 100% Estane 58881, the cover was a conventional Li/Na SURLYN® blend and the core was a conventional cross-linked polybutadiene core. Also tested were conventional two piece golf balls (a Titleist HVC 90 and Pinnacle Gold). Each ball was tested in a True Temper Test Machine. The test machine was configured to strike the balls with a Driver and an Eight Iron.

TABLE II

Spin Rate Test Results for Driver

| Sample | Launch | Std. | Spin (rpm) | Std. | Velocity (ft/sec) | Std. |
|---|---|---|---|---|---|---|
| Titleist HVC (Control) | 9.3° | 0.4 | 3038 | 287 | 159.8 | 1.6 |
| Pinnacle Gold (Control) | 9.3° | 0.4 | 3027 | 303 | 158.9 | 1.5 |
| Estane Mantle w/ 1.30" polybutadiene core and Li/Na SURYLN cover | 8.8° | 0.6 | 3677 | 188 | 156.50 | 0.9 |

TABLE III

Spin Rate Test Results for 8-Iron

| Sample | Launch | Std. | Spin (rpm) | Std. | Velocity (ft/sec) | Std. |
|---|---|---|---|---|---|---|
| Titleist HVC (Control) | 19.5° | 0.3 | 7690 | 175 | 113.0 | 0.8 |
| Pinnacle Gold (Control) | 19.8° | 0.4 | 7549 | 209 | 112.5 | 1.0 |
| Estane Mantle w/ 1.30" polybutadiene core and Li/Na SURYLN cover | 18.7° | 0.5 | 8115 | 257 | 110.7 | 1.1 |

Tables IV and V provide test data obtained from a preferred embodiment of the present invention. In particular, the spin rate and velocity were measured for a golf ball formed according to the present invention. In the ball, the mantle layer was Hytrel 3078, the cover was a conventional Li/high acid Na SURLYN® 50/50 blend (SURLYN 7940/ SURLYN 8140) and the core was a conventional cross-linked polybutadiene core. The core had a diameter of 1.39 inches and a specific gravity of about 1.25. The mantle layer was 0.06 inches thick and the cover was 0.085 inches thick. Also tested were conventional two piece golf balls (Titleist HVC 90 and Pinnacle Gold) for comparison. Each ball was tested in a True Temper Test Machine. The test machine was configured to strike the balls with a Driver and an Eight Iron.

TABLE IV

Spin Rate Test Results for Driver

| Sample | Launch Angle | Spin (rpm) | Velocity (ft/sec) |
|---|---|---|---|
| Titleist HVC (control) | 9.3° | 3038 | 234.9 |
| Pinnacle Gold (control) | 9.3° | 3027 | 233.6 |
| Li/Na (high acid) SURLYN cover Hytrel 3078 mantle layer w/1.39" polybutadiene core | 9.1° | 2966 | 234.7 |

TABLE V

Spin Rate Test Results for 8-Iron

| Sample | Launch Angle | Spin (rpm) | Velocity (ft/sec) |
|---|---|---|---|
| Titleist HVC (control) | 19.5° | 7690 | 166.1 |
| Pinnacle Gold (control) | 19.8° | 7549 | 165.4 |
| Li/Na (high acid) SURLYN cover Hytrel 3078 mantle layer w/1.39" polybutadiene core | 20.2° | 7326 | 167.9 |

As shown by test data above, the golf ball according to this embodiment has a high initial velocity and low spin rate for good distance. Moreover, the ball has a soft "feel", more like a wound ball. Still further, the balls of this invention are easy to manufacture compared to the conventional wound ball. Thus, this ball provides advantages of two piece balls with soft "feel".

The following terms that are used in this application are defined in terms of the enumerated ASTM tests:

Specific gravity ASTM D-792
Flex Modulus ASTM D-790
Shore D Hardness ASTM D-2240
Tensile Modulus ASTM D-638

We claim:

1. A golf ball comprising:
   (a) a core;
   (b) at least one cover layer having a flex modulus of greater than 80,000 psi; and
   (c) one or more mantle layers disposed between the core and cover layer, wherein the mantle layer(s) has a flex modulus of less than 10,000 psi.

2. The golf ball of claim 1 wherein the mantle layer comprises a polymer selected from the group of thermoplastic polyetherester and thermoplastic polyetheramide.

3. The golf ball of claim 1, wherein the thickness of the mantle layer is from about 0.025 inches to about 0.125 inches.

4. The golf ball of claim 1, wherein the core has a diameter of about 1.30 inches to about 1.45 inches and a specific gravity greater than 1.2.

5. The golf ball of claim 1, wherein the cover has a first specific gravity, the mantle layer has a second specific gravity greater than the first specific gravity, and the core has a third specific gravity greater than the second specific gravity.

6. The golf ball of claim 5 wherein the first specific gravity is less than about 1.1, the second specific gravity is between about 1 and 1.2 and the third specific gravity is greater than about 1.2.

7. The golf ball of claim 1, wherein the mantle layer has a flex modulus of less than about 5,000 psi.

8. The golf ball of claim 1, wherein the mantle has a tensile modulus of less than about 10,000 psi.

9. The golf ball of claim 1, wherein the mantle layer has a Shore D hardness of less than about 60.

10. The golf ball of claim 9 wherein the mantle layer has a Shore D hardness of about 30.

11. The golf ball of claim 1 wherein the cover has a flex modulus greater than 100,000 psi.

12. The golf ball of claim 1 wherein the overall diameter of the finished ball is about 1.68 inches to about 1.80 inches.

13. The golf ball according to claim 1,
    wherein the cover layer comprises an inner layer and an outer layer.

14. The golf ball of claim 13, wherein the inner layer comprises a thermoplastic or thermoset material and the outer layer comprises a thermoplastic or thermoset material.

15. The golf ball of claim 14, wherein the inner layer comprises a thermoplastic or thermoset material and the outer layer comprises a thermoplastic or thermoset material, wherein the material of the outer layer has a melting point or heat of reaction temperature lower than the melting point or heat of reaction temperature of the material of the inner layer.

16. The golf ball of claim 14, wherein the inner layer comprises thermoplastic elastomers, thermoplastic rubber or thermoset elastomers and the outer layer comprises thermoplastic elastomers, thermoplastic rubber or a thermoset elastomer.

17. The golf ball of claim 14, wherein the inner layer comprises polyether or polyester thermoplastic urethane or a thermoset polyurethane and wherein the outer layer comprises a urethane or on ionomer resin.

18. The golf ball of claim 13, wherein the inner layer has a thickness of about 0.005 inches to about 0.040 inches and the outer layer has a thickness of about 0.010 to about 0.100 inches.

19. The golf ball of claim 13, wherein the overall diameter of the finished ball is about 1.68 inches to about 1.80 inches.

20. The golf ball of claim 13, wherein the mantle layer comprises a foamed polymeric material.

21. The golf ball of claim 20, wherein the inner layer comprises a foamed polymeric material.

22. The golf ball of claim 1,
    wherein the mantle layer(s) comprises one or more polymers selected from a dynamically vulcanized thermoplastic elastomer, a functionalized styrene-butadine elastomer, polyetherester, polyetheramide, a metallocene catalyzed polyolefin polymer, a thermoplastic polyurethane and blends thereof.

23. The golf ball of claim 22, wherein the mantle layer comprises a dynamically vulcanized thermoplastic elastomer.

24. The golf ball of claim 22, wherein the mantle layer comprises a foamed form of any one or more polymers.

25. The golf ball of claim 13, wherein the mantle layer comprises a blend of a first thermoplastic material comprising a dynamically vulcanized thermoplastic elastomer, a functionalized styrene-butadiene elastomer, a polyetherester, a polyetheramide, a metallocene catalyzed polyolefin polymer or a thermoplastic polyurethane or blends thereof and a second thermoplastic material.

26. The golf ball of claim 25, wherein the blend comprises about 1% to about 99% of a first thermoplastic and about 99% to about 1% of a second thermoplastic.

27. The golf ball of claim 25, wherein the blend comprises about 5% to about 95% of a first thermoplastic and about 95% to about 5% of a second thermoplastic.

28. The golf ball of claim 25, wherein the second thermoplastic material comprises one or more polymers selected from a thermoplastic polyurethane, a thermoplastic polyetherester and polyetheramide, thermoplastic polyesters, polyetherester, polyetheramide, thermoplastic ionomer resins, another dynamically vulcanized elastomer, a functionalized styrene-butadiene elastomer, a metallocene polymer.

29. The golf ball of claim 25, wherein the first thermoplastic is a dynamically vulcanized thermoplastic elastomer or blend thereof.

30. The golf ball of claim 22, wherein the thickness of the mantle layer is from about 0.025 inches to about 0.125 inches.

31. The golf ball of claim 22, wherein the diameter of the core is about 1.30 inches to about 1.45 inches.

32. The golf ball of claim 22, wherein the mantle layer has a Bayshore resilience of about 35 to about 70, and the core has a Bayshore resilience of about 40 to about 60.

33. The golf ball of claim 22, wherein the mantle has a flex modulus of about 500 psi to about 5,000 psi.

34. The golf ball of claim 22, wherein the mantle has a tensile modulus of about 500 psi to about 10,000 psi.

35. The golf ball of claim 22, wherein the mantle layer has a Shore D hardness of less than about 60.

36. The golf ball of claim 22, wherein the core comprises a wound core, wherein the wound core comprises a center about which an elastic thread is wound such that the overall diameter of the wound core is about 75% to about 90% of the overall diameter of the finished ball.

37. The golf ball of claim 22, wherein the overall diameter of the finished ball is about 1.68 inches to about 1.80 inches.

38. The golf ball of claim 13, wherein the polymers or copolymers of the cover are blended and reinforced with glass fibers, glass spheres or wood pulp.

* * * * *